C. T. MADSEN.
CONCRETE MIXER.
APPLICATION FILED MAY 1, 1918.

1,291,981. Patented Jan. 21, 1919.

Inventor.
Chresten T. Madsen
By Strong & Townsend,
ATTORNEYS

UNITED STATES PATENT OFFICE.

CHRESTEN TORBEN MADSEN, OF OAKLAND, CALIFORNIA.

CONCRETE-MIXER.

1,291,981. Specification of Letters Patent. Patented Jan. 21, 1919.

Application filed May 1, 1918. Serial No. 231,798.

*To all whom it may concern:*

Be it known that I, CHRESTEN T. MADSEN, a citizen of the United States, residing at Oakland, in the county of Alameda and State of California, have invented new and useful Improvement in Concrete-Mixers, of which the following is a specification.

This invention relates to an apparatus which is especially designed to mix the ingredients composing concrete.

It consists of a portable, wheeled device, including the parts necessary to direct and mingle the ingredients in proper proportions and in intimate relation.

It also comprises details of construction which will be more fully explained by reference to the accompanying drawings, in which—

Figure 1:
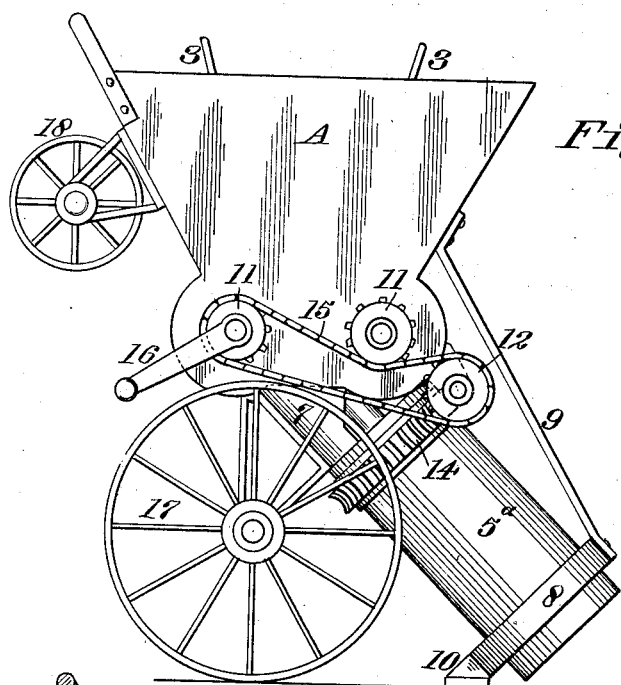
Figure 2:
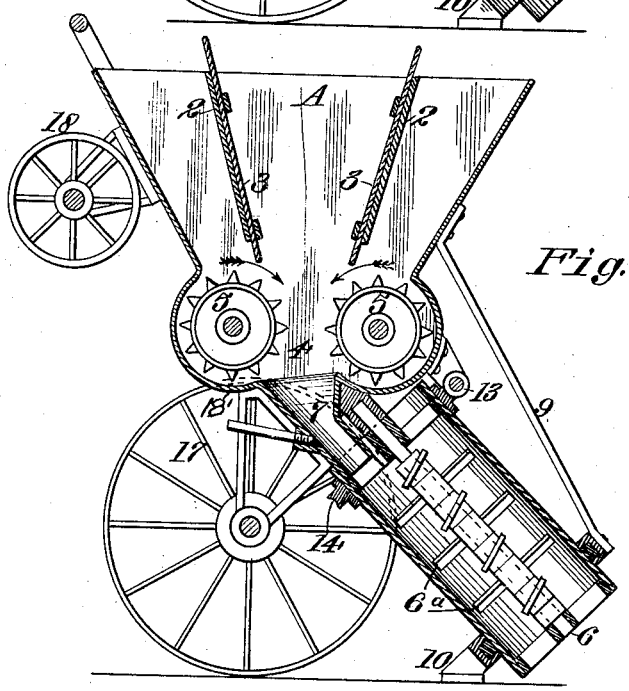

Figure 1 is an exterior view of the apparatus. Fig 2 is a vertical section transversely to the wheel axle.

The object of this invention is to provide a portable wheeled machine, having compartments into which the materials used are separately delivered and in which they are brought together in proper proportion and intimately mixed during the progress of the mass toward its discharge.

The apparatus consists, as here shown, of a convergent hopper A divided into three compartments by means of convergent interior partitions 2, having gates 3 which may be adjusted to change the proportions of sand, gravel and cement which may be delivered to the combining chamber 4. This chamber forms the bottom of the hopper and is in the form of two concave segments, within which are journaled corrugated rollers or members 5 between which the ingredients pass.

A cylindrical chute $5^a$ extends at an angle below the chamber 4, and a shaft 6 extends centrally through the chute. To this shaft the radial mixing arms $6^a$ are fixed, and a passage 7 leads from the chamber 4 into the cylinder. The cylinder $5^a$ has its upper end journaled in the lower end of chamber 4 and the shaft 6 together with its arms $6^a$, is rotatable with the cylinder. A guide 8 is supported by a brace rod 9 from the hopper A and has a foot 10 which may rest upon the ground when the machine is in working position, so that the mixture, after passing through the cylinder, may be discharged from the lower end of the cylinder.

The corrugated rollers 5 are mounted on shafts which extend through the side of the case and carry sprockets 11 on the exterior ends. At the side of the hopper, in convenient relation with the sprockets 11, is another sprocket 12, upon the shaft of which is a worm 13 which engages a worm gear 14 mounted upon the cylinder $5^a$. A sprocket chain 15 is adjusted about the sprockets 11 and 12 and, by means of a crank 16 upon one sprocket shaft, the apparatus may be operatively revolved.

Sand, gravel and cement are placed in the respective divisions of the hopper A and the gates 3 are set to deliver the proper proportions of each to make the desired mixture. The machine is made portable by mounting it on a pivoted frame 18' supported upon wheels 17, the axle of which forms the center about which the machine may be tilted to its working position in which it is supported by the wheels and the shoe or foot 10. When it is to be moved, it is tilted into an approximately horizontal position and rests upon the wheels 17 and upon a wheel 18, the bearing shaft of which is turnable on a support fixed to the hopper A.

This apparatus provides a portable and very effective means to mix concrete and deliver it at any point of use.

Having thus described my invention, what I claim and desire to secure by Letters Patent is:—

In a portable concrete mixing machine, a wheeled hopper open at its rear end, a mixing cylinder rotatably connected at its rear end to the lower end of the hopper, means to rotatably support the front end of the cylinder, ground engaging means associated with the last named means, said cylinder being angularly related to the hopper and tilting supporting means for both the hopper and cylinder whereby when the hopper is raised at its rear to operative position the same will have a substantially vertical disposition with its rear end faced upwardly and will be held in said vertical position by the ground engaging means and the cylinder will be supported at a downward incline by said ground engaging means.

In testimony whereof I have hereunto my hand in the presence of two subscril witnesses.

CHRESTEN TORBEN MADSE

Witnesses:
W. W. HEALEY,
M. E. EWING.